(12) United States Patent
Standerfer et al.

(10) Patent No.: US 9,192,110 B2
(45) Date of Patent: Nov. 24, 2015

(54) CENTRAL IRRIGATION CONTROL SYSTEM

(75) Inventors: Paul A. Standerfer, Claremont, CA (US); Gerald L. Mock, Corona, CA (US); Utah Iev, Hawthorne, CA (US); John F. Fuller, Murrieta, CA (US); Tu Minh Nguyen, Corona, CA (US); Jason Lester Hill, Capistrano Beach, CA (US); Scott Vincent Myers, Camarillo, CA (US); Stephan Crain, Carrboro, NC (US); Steven A. Snow, Redlands, CA (US); Stanley C. Campbell, Riverside, CA (US); Russ Huffman, Glendale, AZ (US)

(73) Assignee: The Toro Company, Bloomington, MN (US)

( * ) Notice: Subject to any disclaimer, the term of this patent is extended or adjusted under 35 U.S.C. 154(b) by 382 days.

(21) Appl. No.: 13/208,249

(22) Filed: Aug. 11, 2011

(65) Prior Publication Data

US 2012/0041606 A1    Feb. 16, 2012

Related U.S. Application Data

(60) Provisional application No. 61/372,814, filed on Aug. 11, 2010.

(51) Int. Cl.
*G05D 7/06*      (2006.01)
*A01G 25/16*     (2006.01)

(52) U.S. Cl.
CPC ..................................... *A01G 25/16* (2013.01)

(58) Field of Classification Search
CPC ... A01G 25/16; A01G 25/162; A01G 25/165; G05B 2219/2625; B05B 12/00
USPC ............ 700/284; 239/69; 715/700, 764, 771, 715/772, 808, 810, 835, 846, 853, 961, 965
See application file for complete search history.

(56) References Cited

U.S. PATENT DOCUMENTS

| 3,107,056 A | 10/1963 | Hunter |
| 3,713,584 A | 1/1973 | Hunter |
| 3,724,757 A | 4/1973 | Hunter |

(Continued)

FOREIGN PATENT DOCUMENTS

| WO | WO 90/03724 A1 | 4/1990 |
| WO | WO 99/39567 A1 | 8/1999 |

(Continued)

OTHER PUBLICATIONS

United States Patent and Trademark Office, Final Office Action mailed Sep. 8, 2010 in U.S. Appl. No. 12/240,859, 10 pages.

(Continued)

*Primary Examiner* — Charles Kasenge
(74) *Attorney, Agent, or Firm* — Inskeep IP Group, Inc.

(57) ABSTRACT

In one embodiment of the present invention, irrigation software is provided for an irrigation system. The irrigation software may include a hierarchical watering plan display, water pump adjustment, water pump efficiency profile use, a soil moisture interface, a historical flow interface, a demand ET interface, an instant program interface, an instant program interface, a manual irrigation interface, a precipitation management group interface, a rain schedule adjustment algorithm, a map-to-monitor button, a universal start time shift interface, and a conditional screen saver.

18 Claims, 17 Drawing Sheets

(56) References Cited

U.S. PATENT DOCUMENTS

| | | | |
|---|---|---|---|
| 3,854,664 A | 12/1974 | Hunter | |
| 3,869,854 A | 3/1975 | Church | |
| 3,921,912 A | 11/1975 | Hayes | |
| 3,934,820 A | 1/1976 | Phaup | |
| 4,090,764 A | 5/1978 | Malsby et al. | |
| 4,131,234 A | 12/1978 | Pescetto | |
| 4,152,750 A | 5/1979 | Bremenour et al. | |
| 4,165,532 A | 8/1979 | Kendall et al. | |
| 4,184,880 A | 1/1980 | Huber et al. | |
| 4,201,344 A | 5/1980 | Lichte | |
| 4,209,131 A | 6/1980 | Barash et al. | |
| 4,242,721 A | 12/1980 | Krolak et al. | |
| 4,244,022 A | 1/1981 | Kendall | |
| 4,304,989 A | 12/1981 | Vos et al. | |
| 4,522,338 A | 6/1985 | Williams | |
| 4,569,020 A | 2/1986 | Snoddy et al. | |
| 4,626,984 A | 12/1986 | Unruh et al. | |
| 4,646,224 A | 2/1987 | Ransburg et al. | |
| 4,672,510 A | 6/1987 | Castner | |
| 4,708,291 A | 11/1987 | Grundy | |
| 4,827,155 A | 5/1989 | Firebaugh | |
| 4,852,051 A | 7/1989 | Mylne, III | |
| 4,873,925 A | 10/1989 | Hultberg et al. | |
| 4,902,131 A | 2/1990 | Yamazaki et al. | |
| D306,575 S | 3/1990 | Brundisini | |
| 4,922,407 A | 5/1990 | Birk et al. | |
| 4,932,590 A | 6/1990 | Hunter | |
| 4,937,732 A | 6/1990 | Brundisini | |
| 4,937,746 A | 6/1990 | Brundisini | |
| 4,971,250 A | 11/1990 | Hunter | |
| 5,038,268 A | 8/1991 | Krause et al. | |
| 5,097,861 A | 3/1992 | Hopkins et al. | |
| 5,101,083 A | 3/1992 | Tyler et al. | |
| 5,124,942 A | 6/1992 | Nielsen et al. | |
| 5,187,797 A | 2/1993 | Nielsen et al. | |
| 5,229,937 A | 7/1993 | Evelyn-Veere | |
| 5,251,153 A | 10/1993 | Nielsen et al. | |
| 5,262,936 A | 11/1993 | Faris et al. | |
| 5,265,005 A | 11/1993 | Schmidt et al. | |
| 5,272,620 A | 12/1993 | Mock et al. | |
| 5,278,749 A | 1/1994 | De Man | |
| 5,293,554 A | 3/1994 | Nicholson | |
| 5,331,619 A | 7/1994 | Barnum et al. | |
| 5,363,290 A | 11/1994 | Doup et al. | |
| 5,381,331 A | 1/1995 | Mock et al. | |
| 5,383,600 A | 1/1995 | Verbera et al. | |
| 5,400,246 A | 3/1995 | Wilson et al. | |
| 5,410,717 A | 4/1995 | Floro | |
| 5,414,618 A | 5/1995 | Mock et al. | |
| 5,421,738 A | 6/1995 | Roberts | |
| 5,444,611 A | 8/1995 | Woytowitz et al. | |
| 5,458,048 A | 10/1995 | Hohner | |
| 5,479,338 A | 12/1995 | Ericksen et al. | |
| 5,479,339 A | 12/1995 | Miller | |
| 5,602,728 A | 2/1997 | Madden et al. | |
| 5,641,122 A | 6/1997 | Alkalai et al. | |
| 5,696,671 A | 12/1997 | Oliver | |
| 5,718,381 A | 2/1998 | Katzer et al. | |
| 5,742,500 A | 4/1998 | Irvin | |
| 5,746,250 A | 5/1998 | Wick | |
| 5,748,466 A | 5/1998 | McGivern et al. | |
| 5,834,693 A | 11/1998 | Waddell et al. | |
| 5,850,352 A | 12/1998 | Moezzi et al. | |
| 5,921,280 A | 7/1999 | Ericksen et al. | |
| 5,956,248 A | 9/1999 | Williams et al. | |
| 5,959,610 A | 9/1999 | Silfvast | |
| 6,073,110 A | 6/2000 | Rhodes et al. | |
| 6,076,740 A | 6/2000 | Townsend | |
| 6,088,621 A | 7/2000 | Woytowitz et al. | |
| 6,098,898 A | 8/2000 | Storch | |
| 6,102,061 A | 8/2000 | Addink | |
| 6,145,755 A | 11/2000 | Feltz | |
| 6,227,220 B1 | 5/2001 | Addink | |
| 6,236,332 B1 | 5/2001 | Conkright et al. | |
| 6,256,191 B1 | 7/2001 | Curlee | |
| 6,259,970 B1 | 7/2001 | Brundisini | |
| 6,298,285 B1 | 10/2001 | Addink et al. | |
| 6,313,852 B1* | 11/2001 | Ishizaki et al. | 715/751 |
| 6,326,956 B1 | 12/2001 | Jaeger et al. | |
| 6,453,215 B1 | 9/2002 | Lavoie | |
| 6,453,216 B1 | 9/2002 | McCabe et al. | |
| 6,490,505 B1 | 12/2002 | Simon et al. | |
| 6,507,967 B2 | 1/2003 | Johnson | |
| 6,535,771 B1 | 3/2003 | Kussel | |
| 6,651,904 B2 | 11/2003 | Roman | |
| 6,694,195 B1 | 2/2004 | Garcia | |
| 6,704,032 B1 | 3/2004 | Falcon et al. | |
| 6,772,050 B2 | 8/2004 | Williams et al. | |
| 6,782,310 B2 | 8/2004 | Bailey et al. | |
| 6,813,911 B2 | 11/2004 | Peterson et al. | |
| 6,823,239 B2* | 11/2004 | Sieminski | 700/284 |
| 6,827,288 B2 | 12/2004 | Noelke | |
| 6,832,239 B1 | 12/2004 | Kraft et al. | |
| 6,850,819 B1 | 2/2005 | Townsend | |
| 6,853,883 B2 | 2/2005 | Kreikemeier et al. | |
| 6,895,987 B2 | 5/2005 | Addink et al. | |
| 6,898,467 B1 | 5/2005 | Smith et al. | |
| 6,950,728 B1 | 9/2005 | Addink et al. | |
| 7,003,357 B1 | 2/2006 | Kreikemeier et al. | |
| 7,010,395 B1* | 3/2006 | Goldberg et al. | 700/284 |
| 7,010,396 B2* | 3/2006 | Ware et al. | 700/284 |
| 7,028,920 B2 | 4/2006 | Hekman et al. | |
| 7,051,952 B2 | 5/2006 | Drechsel | |
| 7,058,479 B2 | 6/2006 | Miller | |
| 7,090,146 B1 | 8/2006 | Ericksen et al. | |
| 7,103,511 B2 | 9/2006 | Petite | |
| 7,123,993 B1* | 10/2006 | Freeman et al. | 700/284 |
| 7,133,749 B2 | 11/2006 | Goldberg et al. | |
| 7,133,800 B2 | 11/2006 | Delin et al. | |
| 7,146,254 B1 | 12/2006 | Howard | |
| 7,182,272 B1 | 2/2007 | Marian | |
| 7,203,576 B1 | 4/2007 | Wilson et al. | |
| 7,225,057 B2 | 5/2007 | Froman et al. | |
| 7,257,465 B2 | 8/2007 | Perez et al. | |
| 7,280,892 B2 | 10/2007 | Bavel | |
| 7,353,113 B2 | 4/2008 | Sprague et al. | |
| 7,363,113 B2 | 4/2008 | Runge et al. | |
| 7,400,944 B2 | 7/2008 | Bailey et al. | |
| 7,403,840 B2* | 7/2008 | Moore et al. | 700/284 |
| 7,532,954 B2* | 5/2009 | Evelyn-Veere | 700/284 |
| 7,574,284 B2 | 8/2009 | Goldberg et al. | |
| 7,584,023 B1* | 9/2009 | Palmer et al. | 700/284 |
| 7,613,546 B2 | 11/2009 | Nelson et al. | |
| 7,640,079 B2 | 12/2009 | Nickerson et al. | |
| 7,748,646 B2 | 7/2010 | Clark | |
| 7,761,189 B2 | 7/2010 | Froman et al. | |
| 7,844,367 B2 | 11/2010 | Nickerson et al. | |
| 7,883,027 B2* | 2/2011 | Fekete | 700/284 |
| 8,024,075 B2* | 9/2011 | Fekete | 700/284 |
| 8,209,061 B2* | 6/2012 | Palmer et al. | 700/284 |
| 8,219,935 B2* | 7/2012 | Hunts et al. | 700/284 |
| 2001/0049563 A1 | 12/2001 | Addink et al. | |
| 2002/0002425 A1 | 1/2002 | Dossey et al. | |
| 2002/0010516 A1 | 1/2002 | Addink et al. | |
| 2002/0014539 A1 | 2/2002 | Pagano et al. | |
| 2002/0059005 A1 | 5/2002 | Sarver et al. | |
| 2002/0060631 A1 | 5/2002 | Runge et al. | |
| 2002/0075199 A1 | 6/2002 | Asahi et al. | |
| 2002/0100814 A1 | 8/2002 | Pollak et al. | |
| 2002/0130818 A1 | 9/2002 | Viertl | |
| 2002/0166898 A1 | 11/2002 | Buhler et al. | |
| 2003/0001880 A1 | 1/2003 | Holtz et al. | |
| 2003/0093159 A1 | 5/2003 | Sieminski | |
| 2003/0169289 A1 | 9/2003 | Holt et al. | |
| 2003/0179102 A1 | 9/2003 | Barnes | |
| 2003/0179109 A1 | 9/2003 | Chamas et al. | |
| 2003/0182022 A1 | 9/2003 | Addink et al. | |
| 2004/0015270 A1 | 1/2004 | Addink et al. | |
| 2004/0039813 A1 | 2/2004 | Clark et al. | |
| 2004/0039934 A1 | 2/2004 | Land et al. | |
| 2004/0143602 A1 | 7/2004 | Ruiz et al. | |
| 2004/0181315 A1 | 9/2004 | Cardinal et al. | |
| 2004/0212679 A1 | 10/2004 | Jun | |
| 2004/0233983 A1 | 11/2004 | Crawford et al. | |

(56) References Cited

U.S. PATENT DOCUMENTS

| | | | |
|---|---|---|---|
| 2004/0236443 A1* | 11/2004 | Ware et al. | 700/90 |
| 2005/0064875 A1 | 3/2005 | Gonsalves et al. | |
| 2005/0121536 A1 | 6/2005 | Bavel | |
| 2005/0154498 A1 | 7/2005 | Townsend | |
| 2005/0173557 A1 | 8/2005 | Kah, III | |
| 2005/0210101 A1 | 9/2005 | Janik | |
| 2005/0216302 A1 | 9/2005 | Raji et al. | |
| 2006/0027677 A1 | 2/2006 | Abts | |
| 2006/0116791 A1* | 6/2006 | Ravula et al. | 700/284 |
| 2006/0122735 A1 | 6/2006 | Goldberg et al. | |
| 2006/0123053 A1 | 6/2006 | Scannell | |
| 2006/0158438 A1 | 7/2006 | Hunter | |
| 2006/0178781 A1 | 8/2006 | Simon et al. | |
| 2006/0293797 A1 | 12/2006 | Weiler | |
| 2007/0016334 A1* | 1/2007 | Smith et al. | 700/284 |
| 2007/0127429 A1 | 6/2007 | Bryan et al. | |
| 2008/0186166 A1 | 8/2008 | Zhou et al. | |
| 2009/0099701 A1* | 4/2009 | Li et al. | 700/284 |
| 2009/0145974 A1* | 6/2009 | Fekete | 239/11 |
| 2009/0150001 A1* | 6/2009 | Fekete | 700/284 |
| 2009/0150002 A1* | 6/2009 | Fekete | 700/284 |
| 2009/0281672 A1* | 11/2009 | Pourzia | 700/284 |
| 2009/0319934 A1* | 12/2009 | Hunts et al. | 715/772 |
| 2010/0030389 A1* | 2/2010 | Palmer et al. | 700/284 |
| 2011/0035059 A1* | 2/2011 | Ersavas | 700/284 |
| 2011/0106320 A1* | 5/2011 | Hall | 700/284 |
| 2012/0036091 A1* | 2/2012 | Cook | 705/412 |

FOREIGN PATENT DOCUMENTS

| | | | |
|---|---|---|---|
| WO | WO 01/56204 A1 | 8/2001 | |
| WO | WO 2004/071170 A2 | 8/2004 | |
| WO | WO 2007/050175 A2 | 5/2007 | |
| WO | WO 2007/050175 A3 | 5/2007 | |
| WO | WO 2007050175 A2 * | 5/2007 | |

OTHER PUBLICATIONS

United States Patent and Trademark Office, Final Office Action mailed Jul. 9, 2010 in U.S. Appl. No. 12/091,272, 17 pages.

United States Patent and Trademark Office, Office Action mailed Apr. 13, 2010 in U.S. Appl. No. 11/443,429, 13 pages.

United States Patent and Trademark Office, Office Action mailed Mar. 30, 2010 in U.S. Appl. No. 12/240,859, 11 pages.

United States Patent and Trademark Office, Office Action mailed Mar. 8, 2010 in U.S. Appl. No. 12/091,272, 24 pages.

United States Patent and Trademark Office, Final Office Action mailed Oct. 30, 2009 in U.S. Appl. No. 12/240,859, 9 pages.

United States Patent and Trademark Office, Office Action mailed Mar. 26, 2010 in U.S. Appl. No. 12/240,859, 10 pages.

United States Patent and Trademark Office, Office Action mailed Nov. 6, 2008 in U.S. Appl. No. 11/674,107, 11 pages.

United States Patent and Trademark Office, Final Office Action mailed Nov. 1, 2007 in U.S. Appl. No. 11/329,821, 5 pages.

WIPO, U.S. International Search Authority, International Search Report and Written Opinion mailed May 11, 2007 in International Patent Application No. PCT/US06/29947, 8 pages.

United States Patent and Trademark Office, Office Action mailed Apr. 3, 2007 in U.S. Appl. No. 11/329,821, 5 pages.

United States Patent and Trademark Office, Final Office Action mailed Dec. 4, 2006 in U.S. Appl. No. 11/329,821, 6 pages.

United States Patent and Trademark Office, Office Action mailed Jun. 12, 2006 in U.S. Appl. No. 11/329,821, 11 pages.

"Netafim NMC-64 User/Installation Manual," undated, Netafim Irrigation Systems, Tel Aviv, Israel, Feb. 2004, 58 pages.

SOWACS, "Calculate Field Capacity from Percentage?" forum post by Tareq Al-Zabet Jan. 26, 2002 and responses, 7 pages.

Hunter Rain-Clik Rain Sensors, 2002, Hunter Industries Incorporated, San Marcos, CA, 2 pages.

New Plus+ Model, 2002, R&D Engineering, Inc., Manasquan, NJ, 2 pages.

George et al., "Development and testing of an irrigation schedule model," 2000, Elsevier. pp. 121-136, 16 pages.

Sirbu, M.G. et al., "A Scheduling Expert Advisor for Heterogeneous Environments," 1997, IEEE, pp. 74-82, 9 pages.

LEIT 8000 Universal Control Unit (LEIT 8000-2), SOLATROL Catalog, Feb. 1995, Solatrol Inc., USA, 1 page.

XKit Expander Module Kit (Series 8700), SOLATROL Catalog, Feb. 1995, Solatrol Inc., USA, 1 page.

Expanded Light-Energized Installation, LEIT8000 Light Energized Irrigation Technology Control System Catalog, Jan. 1995, SOLATROL (now DIG Corp.), USA, 1 page.

Irrigation Equipment Catalog, Buckner, USA, 1995, 5 pages.

Researchers Develop Automated Surface Irrigation System, NTIS Tech Notes, NTN83-0860, NTIS, US Dept of Commerce, USA, 1995, 1 page.

Rain Bird Sales, Inc., Tucson, Arizona, "Maxicom Guide to Operations," Chapter 7, Oct. 1994, 57 pages.

Rain Bird Sales, Inc., Tucson, Arizona, "Rain Bird Maxicom Central Control System," Jun. 1994, 8 pages.

Rain Bird Sales, Inc., Tucson, Arizona, "Components of the Maxicom System," p. 3.2, Section 3, Feb. 9, 1994, 1 page.

Motorola, Inc., "MIR5000C Quickstart and Reference Guide," Feb. 1994, 140pp.

Motorola, Inc., "MIR5000 Radio Linked Central Irrigation Control System Planner," TOC and pp. 1-42, Mar. 8, 1993, 46 pages.

Motorola, Inc., "IRRInet Component Descriptions," Feb. 16, 1993, 10 pages.

Motorola, Inc., "Motorola MIR-5000 Component Descriptions," Feb. 16, 1993, 5 pages.

Rain Bird Sales, Inc., Tucson, Arizona, "Central Control System, Maxicom—Guide to Operations," TOC and pp. 5.4-1-2; 5.4-41-42;7.2-1-2, Feb. 1993, 19 pages.

Model 39624 Pedestal Mount Field Controller, Model 39625 Wall Mount Field Controller, Royal Coach/Buckner Catalog, Litho, USA, Jan. 1983, 1 page.

Motorola, Inc., "General Description, Service Manual, IRRInet," 1993, 40 pages.

Motorola, Inc., "IRRInet General Description Service Manual," 16 pages, 1993, 24pages.

Motorola, Inc., "Scorpion AC," TOC and Secs. 1-3, Sep. 1993, 80 pages.

Rain Bird Sales, Inc., Tucson, Arizona, "Landscape Irrigation Products, 1993-1994 Catalog, Central Computer Control System, Maxicom," pp. 98-99, 1993, 3 pages.

Motorola Communications Israel Ltd., "IRRInet Irrigation Field Unit Owner's Manual," TOC and Secs. 1-3, 1992, 78 pages.

Motorola, Inc., "IRRInet Irrigation Field Unit Owner's Manual," TOC and Secs. 1-3, 1992, 82 pages.

Motorola, Inc., Communications Sector, "I/O Module 4 Digital Inputs/16 Solid-State Outputs," 1992, 12 pages.

Motorola, Inc., I IRRInet CPU Module Service Manual, 1992, Motorola, Inc., Schaumberg, IL, 106 pages.

Motorola, Inc., I IRRInet Irrigation Field Unit Owner's Manual 1992 ("IRRInet"), Technical Writing Services, Motorola, Inc., Schaumberg, IL, 82 pages.

Motorola, Inc., "Motorola MIR5000 System Features," Nov. 1991, 20 pages.

Motorola Communications Israel Ltd., "MIR5000C Central System Operating Instructions," 1991, 12 pages.

Pro 8430 and 8420 Series Automatic Irrigation Controllers, L.R. Nelson Corp. Catalog, L.R. Nelson Corporation, USA, 1991, 2 pages.

The Toro Company, Riverside, California, Motorola MIR 5000 Radio-Based Irrigation Central Computer Control System, pp. 1-4, 1991, 4 pages.

V.I.T. Products, Inc., San Diego, California, "The Strong Box," stainless steel controller enclosure specifications, 1991, 10 pages.

Singleton, P.W. et al., *Applied BNF Technology, A Practical Guide for Extension Specialists*, NifTAL Project/BNF Technologies for International Development, College of Tropical Agriculture and Human Resources, University of Hawaii, United States for International Development, Maui, Hawaii, Oct. 1990, 282 pages.

(56) References Cited

OTHER PUBLICATIONS

Modular Solid State Controllers, Buckner Water Management by Design Catalog, USA, May 1990, 8 pages.
"Netafim Drip Irrigation—Printable Version—NMC-64," specifications, undated, from http://www.netafim.com, Netafim Irrigation Systems (printed Jul. 7, 2005), Tel Aviv, Israel, 2 pages.
Maxicom Computer Control System, Rain Bird Catalog, Rain Bird Sprinkler Mfg. Corp, USA, 1990, 4 pages.
Toro 1990 Irrigation Products, Toro Irrigation Products Catalog, Toro, USA, 1990, 3 pages.
Weather-matic 1990-91 Irrigation Equipment Catalog, Weather-matic, USA, 1990-91, 3 pages.
Motorola Communications Israel Ltd., MIR 5000C System Installation Section, 1989, 24 pages.
Walker, W.R., "3. Field Measurements," *Guidelines for Designing and Evaluating Surface Irrigation Systems*, FAO Irrigation and Drainage Paper 45, Food and Agriculture Organization of the United Nations, Rome, 1989, http://www.fao.org/docrep/t0231e/t0231e05.htm#3.%20field%20measurements, 52 pages.
Smart J.C., "The Livermore Security Console System," 1987, CONF-870743-5 Journal Announcement: GRAI8724; NSA 12, 7 pages.
Sales Offices and Warehouses, Royal Coach/Buckner Catalog, Jan. 1983, 1 page, Sheet No. 280-286, Litho, USA.
"Netafim Drip Irrigation—Printable Version—NMC-15," specifications, undated, from http://www.netafim.com (printed Jul. 7, 2005), Netafim Irrigation Systems, Tel Aviv, Israel, 2 pages.
"NMC-15 Advanced Fertigation Controller," brochure, undated, from http://www.netafim.com, Netafim Irrigation Systems, Tel Aviv, Israel, 2 pages.
"NMC-64 Advanced Irrigation, Fertigation & Climate Controller," brochure, undated, from http://www.netafim.com, Netafim Irrigation Systems, Tel Aviv, Israel, 2 pages.
Features and Functions of the 39824/5 Field Controller, Buckner Catalog, USA, 5 pages.
Koala-T Irrigation Controller Photos, P1010983 thru P1010989, Oasis Control Systems, Inc., Chatsworth, CA, 7 pages.
Landscaper Irrigation Controller 12 and 16 Stations, Oasis Controls Specification Sheet, 2 pages, OSS-005B, Philmac Pty Ltd, USA, 2 pages.
Modular Series Electronic Controllers, Buckner Catalog, USA, 3 pages.
Moody Automatic Controllers, Moody Catalog, Moody, USA, 3 pages.
Motorola, Inc., "New Members to the MIR5000 Family, Irrinet and Scorpio," undated, 14 pages.
Pro 8430, 8420 & Pro 8900 Series Controllers, Nelson Irrigation Corp. Catalog, USA, 4 pages.
PTC81 Professional Turf Controller 6 Station, Oasis Controls Specification Sheet, OSS-006A (SP), Philmac PTY LTD, USA, 2 pages.
PTC82 Professional Turf Controller 12 and 18 Stations, Oasis Controls Specification Sheet, OSS-007A (SP), Philmac PTY LTD, USA, 2 pages.
PTC83 Professional Turf Controller 24, 30, 36, 42 Stations, Oasis Controls Specification Sheet, OSS-008A (SP), Philmac PTY LTD, USA, 2 pages.
Vantage Pro Catalog, Davis Instruments, 3 pages.

\* cited by examiner

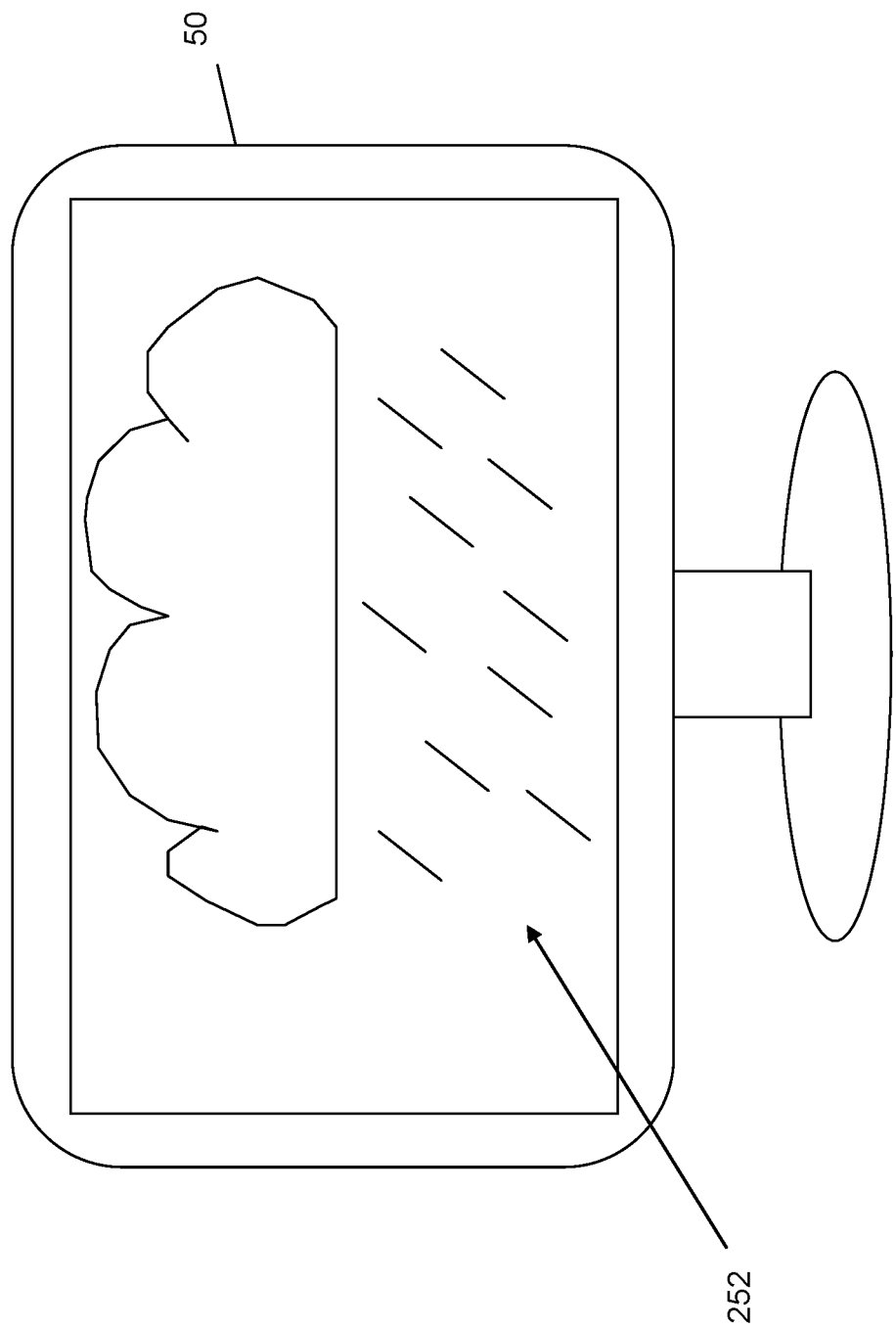

CENTRAL IRRIGATION CONTROL SYSTEM

RELATED APPLICATIONS

This application claims priority to U.S. Provisional Application Ser. No. 61/372,814 filed Aug. 11, 2010 entitled Central Irrigation Control System, the contents of which are incorporated in their entirety herein.

BACKGROUND OF THE INVENTION

Large irrigation systems typically include a central irrigation controller that is responsible for a variety of tasks associated with operation of the irrigation system. Such central controllers are typically software-based systems executed on a local computer system.

The central controller software is typically responsible for planning watering schedules and monitoring operation of the irrigation system. Watering commands or irrigation schedules are typically communicated to a plurality of satellite controllers at various locations on the site. The satellite controllers are connected to valves either in each of the sprinklers or a valve connected to sprinklers or groups sprinklers and can thereby direct each of the sprinklers to water according to the watering schedule.

SUMMARY OF THE INVENTION

In one embodiment of the present invention, irrigation software is provided for an irrigation system. The irrigation software may include a hierarchical watering plan display, water pump adjustment, water pump efficiency profile use, a soil moisture interface, a historical flow interface, a demand evapotranspiration (ET) interface, an instant program interface, a manual irrigation interface, a precipitation management group interface, a rain schedule adjustment algorithm, a map-to-monitor button, a universal start time shift interface, and a conditional screen saver.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIGS. 16 and 17 illustrate a computer monitor and a screen saver according to the present invention.

DESCRIPTION OF EMBODIMENTS

Figure 1:
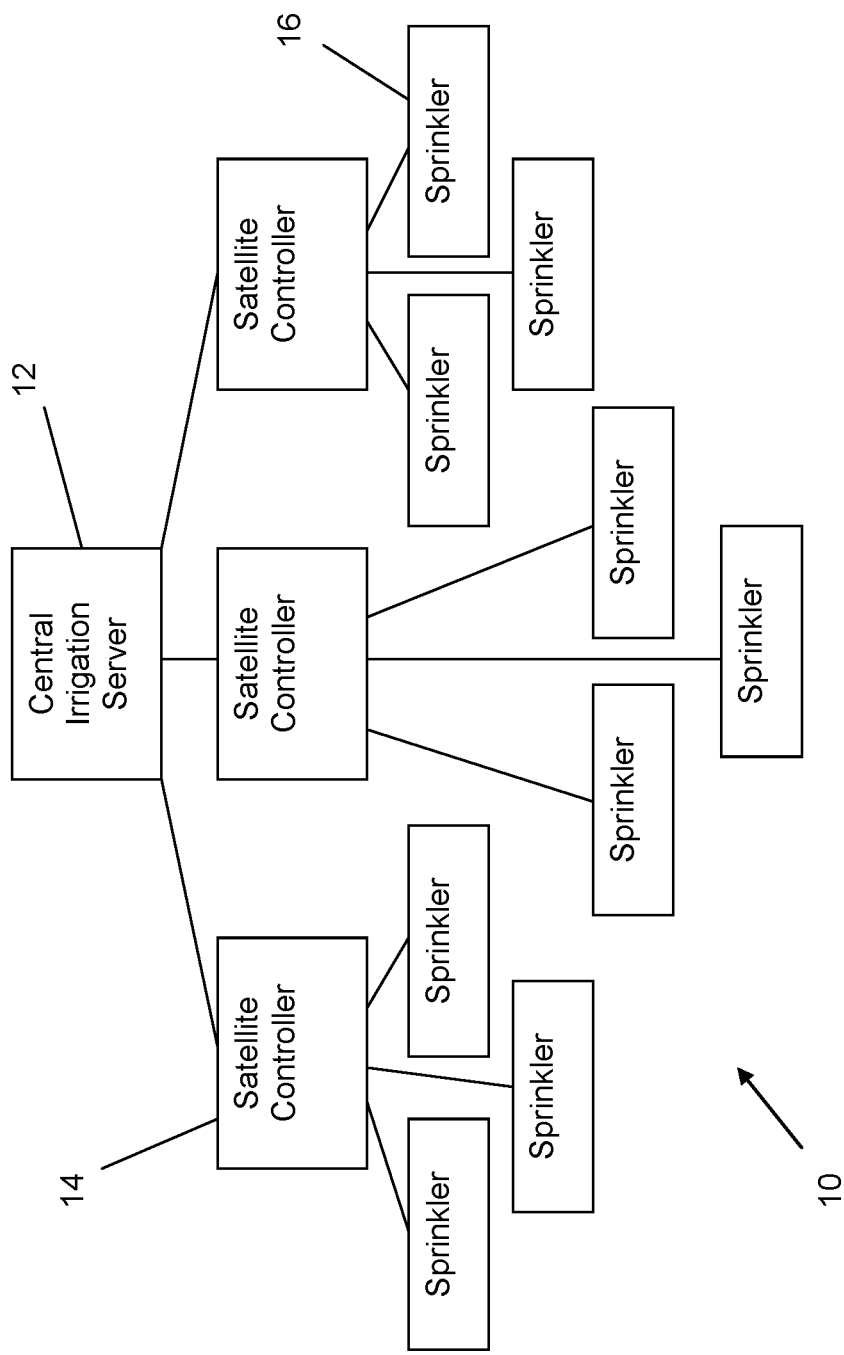
FIG. 1 illustrates an irrigation system for use with the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIGS. 1-16 illustrate various aspects of irrigation control software according to the present invention. Preferably, this control software is located on and executable by a computer. FIG. 1 illustrates an example irrigation system 10 having a central irrigation server 12, such as a PC, which is in communication (e.g., wired or wireless) with a plurality of satellite controllers 14. Each satellite controller is connected to a valve in a sprinkler 16, thereby directly controlling when each sprinkler 16 waters. The central irrigation server 12 communicates watering schedule information to the appropriate satellite controller 14 and the satellite controller 14 operates its connected sprinklers 16 according to this watering schedule.

The central irrigation server 12 may alternately operate over a two-wire encoder/decoder network in which the server 12 is directly connected to each sprinkler 16 via two wires, as is known in the art. These wires provide power and communication signals for a decoder at each sprinkler valve. In this respect, each sprinkler 16 is directly controlled.

Preferably, the irrigation control software is executed by the central irrigation server 12 and stores data (e.g., in a database) in a locally attached storage device. Alternately, the irrigation control software can be executed and stored on a remote server and displayed on the central irrigation server 12 via a webpage over the internet.

Hierarchical Watering Plan Display

Figure 2:
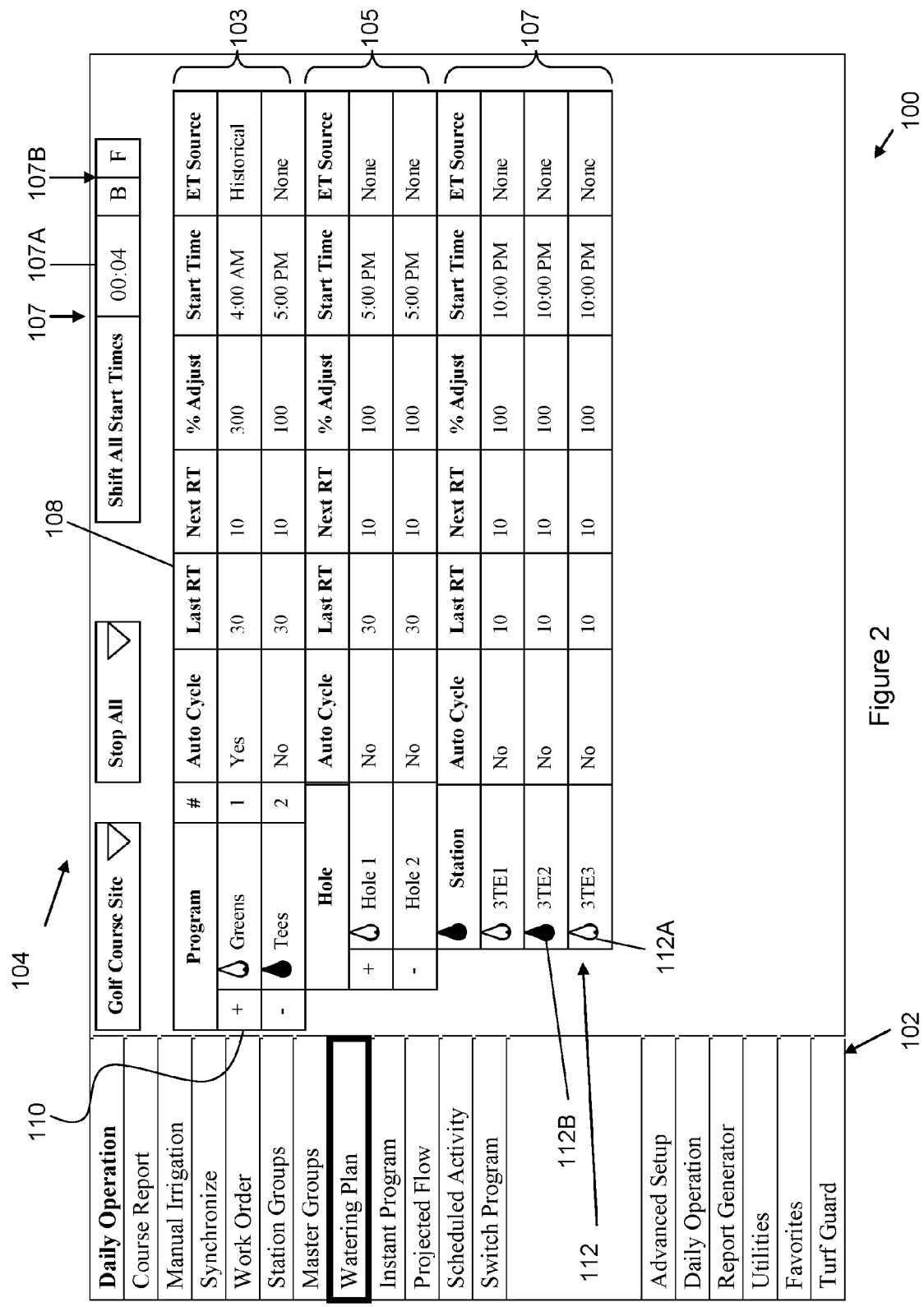
FIG. 2 illustrates a view of an irrigation software display according to a preferred embodiment of the present invention.

FIG. 2 illustrates a watering plan interface 100 of the central control software that uses a hierarchical display to provide both top-level or summary information and more detailed information about specific watering programs or schedules. More specifically, the watering plan interface allows for selectable visual expansion of various subcategories of an irrigation program.

In the specific example shown in FIG. 2, the watering plan action is selected from the action menu 102, which causes the watering plan interface 104 to display. The interface 104 includes a top-level information display 103 for each program comprising a plurality of information or control columns 108. For example, these columns may include a program name, program number, auto cycle control, last runtime, last inches of water applied, next inches of water to be applied, percentage adjust, program start time, priority level, active days, run time calculation adjustments, evapotranspiration mode, evapotranspiration source, reference evapotranspiration value, rainfall amount and a soil moisture sensor value (e.g., from a Turf Guard™ sensor).

The top level information display 103 also includes a "plus/minus" expansion symbol 110 that allows the user to expand or hide subcategories of the main program (e.g., the plus symbol indicates that expansion can occur and the minus symbol indicates that a subcategory is expanded). In the example of FIG. 2, the first subcategory tier 105 illustrates geographic areas that are watered with the program, such as holes of a golf course. This first subcategory tier 103 preferably includes the same or similar columns 108 as the top level program 103. Additionally, each first subcategory tier 105 can include its own selectively expandable second subcategory tier 107, which, in the present example, refers to individual sprinklers residing on the selected hole, a sub set of the selected area.

While not shown, it is possible to add yet additional expandable subcategories under each station displaying information for each sprinkler connected to a specific satellite station. For example, sprinkler column information may include a sprinkler popup indicator, nozzle rotation indicator and a sprinkler water flow indicator.

Figure 3:
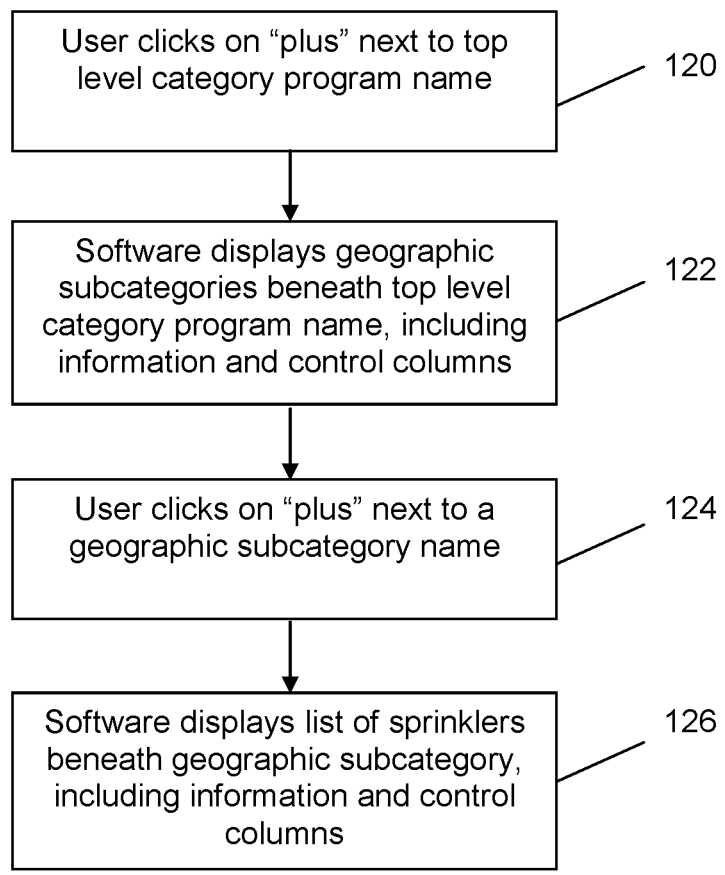
FIG. 3 illustrates a flow chart for navigating a hierarchical interface according to the present invention.

As seen in the operation flow chart of FIG. 3, the user clicks on the "plus" sign 110 next to a specific top level category 103 program name 120. This action causes the software to display a list of geographic subcategories in the first subcategory tier 105 beneath the top level category program name, including information and control columns 108 associated with the subcategory entries 122. The user clicks on the "plus" 110 next to a geographic subcategory name 124. This action causes the software to display a list of sprinklers beneath the geographic subcategory entry in the second subcategory tier 107, including information and control columns 108 associated with each entry 126.

As best seen in FIG. 2, the top level program information also includes a colored indicator 112A and 112B that identifies problems or proper functioning of an irrigation program. In the example of FIG. 2, a white rain drop-shaped indicator 112A indicates proper functionality and a black rain drop-shaped indicator 112B indicates a problem with the irrigation schedule or various components. The indicators 112A and 112B may alternately display a solid color, such as green or red, or a mixed color, such as part green and part red.

In this respect, the top level indicator can indicate if all areas and stations in the subcategories beneath it are operating properly (e.g., color is all green or white 112A), one or more stations have errors or failed to water (e.g., color is partially green and red or black and white), or all areas and stations have errors or failed to water (e.g., color is all red). Each sub category can have similar indicators, identifying errors or proper functioning of that specific subcomponent. Thus, a user can selectively view each subcategory to determine where an error warning is being generated.

Figure 4:
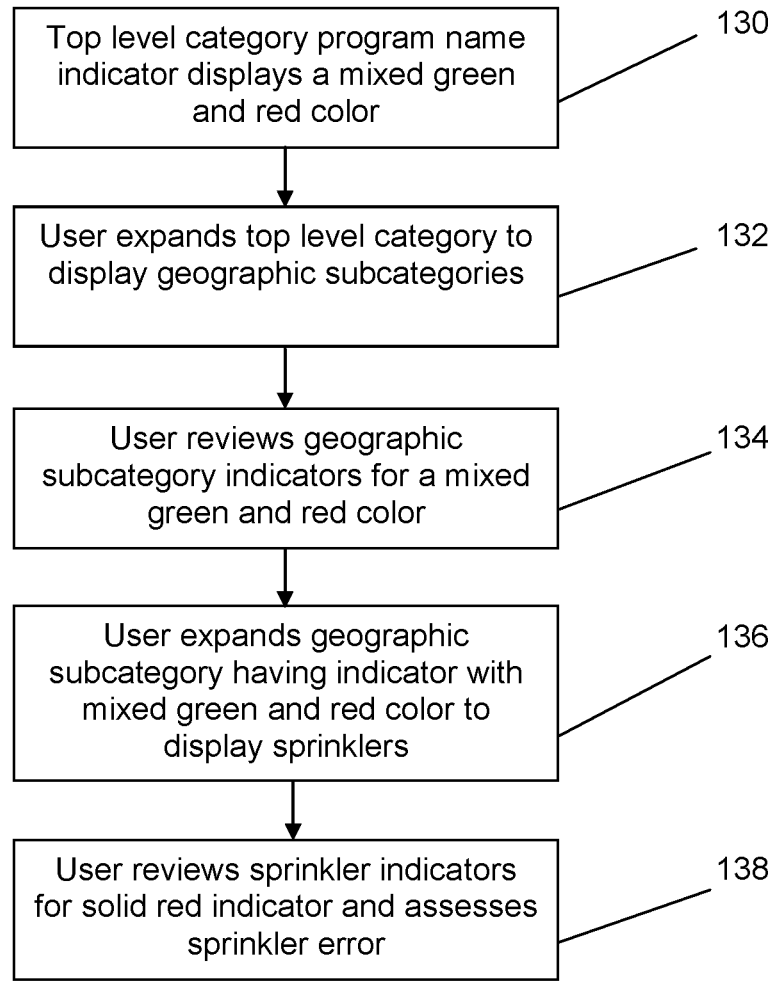
FIG. 4 illustrates a flow chart for navigating a hierarchical interface according to the present invention.
Figure 5:
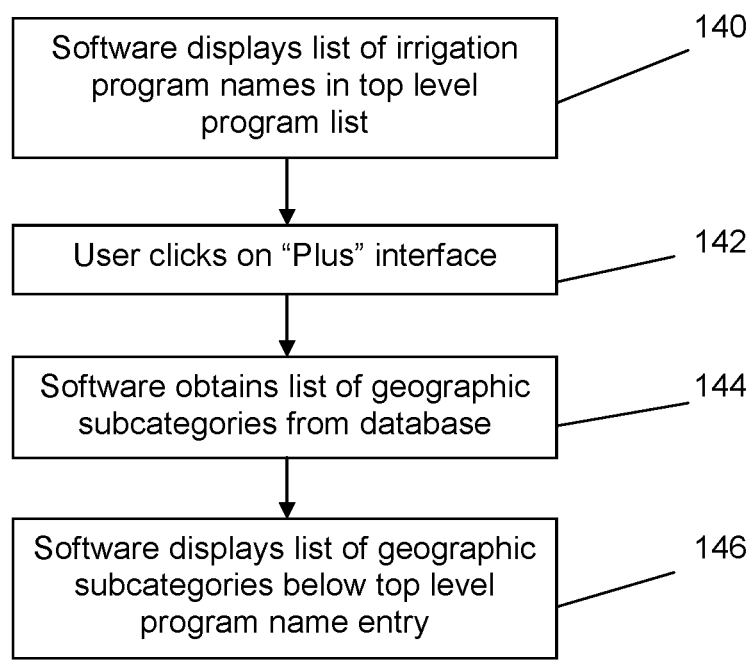
FIG. 5 illustrates a flow chart for navigating a hierarchical interface according to the present invention.

As seen in the operational flow chart of FIG. 4, a problem with a component of the irrigation system 10 used in an irrigation schedule causes the software to display a mixed green and red color in the rain drop-shaped indicator 112, seen in 130. In 132, the user clicks on the plus expansion symbol 110 of the top level tier 103 to expand the first subcategory tier 105. In 134, the user reviews the geographic areas of the first subcategory tier 105 and determines which areas have a red or problem indicator 112 associated with them. In 136, the user expands the sprinkler subcategory of the second subcategory tier 107 and in 138 reviews stations or sprinklers that have a red or problem indicator 112. Once the stations or sprinklers with errors have been identified by the user, corrective action can be performed to address the problem.

Water Pump Adjustments

Figure 6:
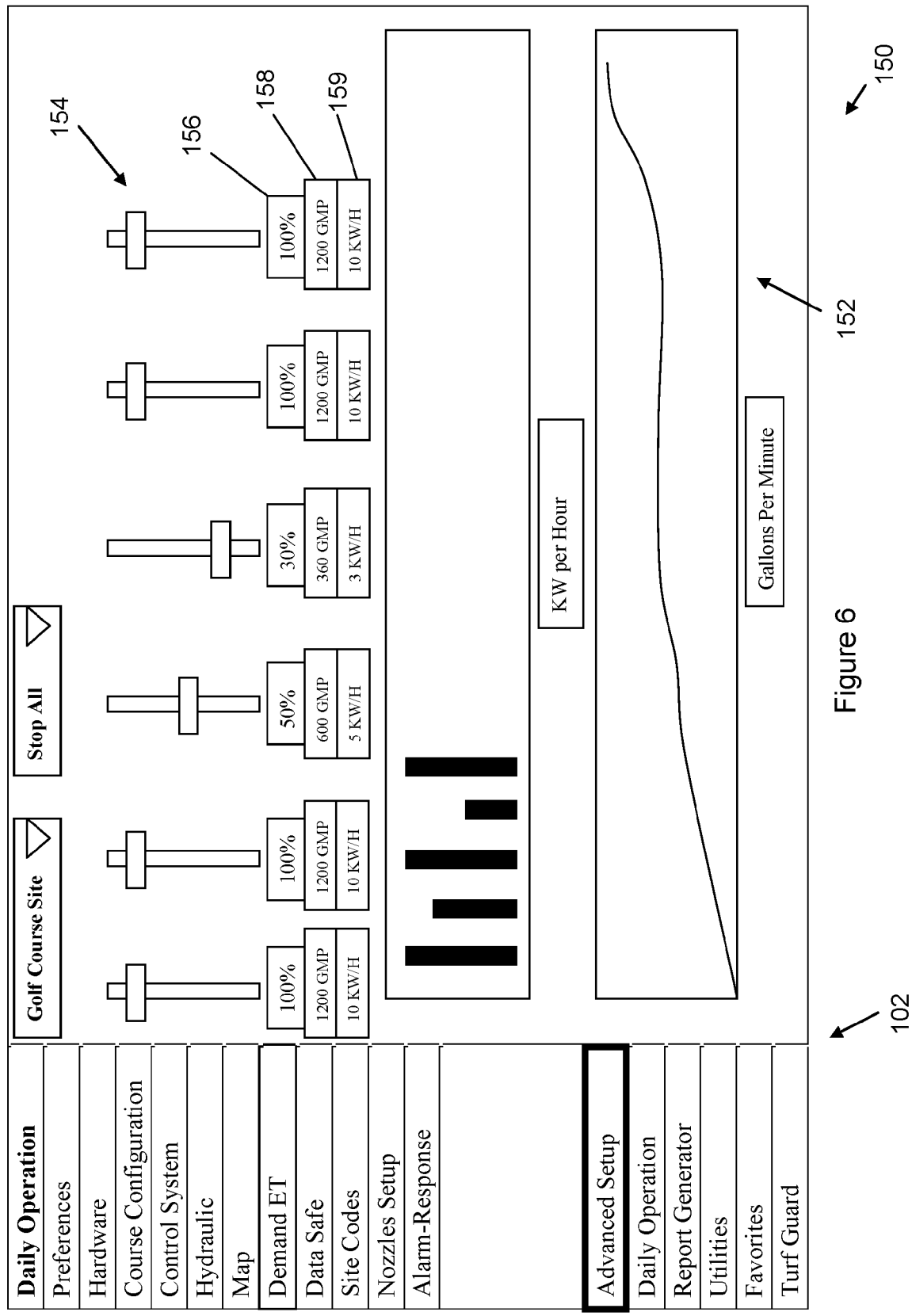
FIG. 6 illustrates a view of an irrigation software display according to a preferred embodiment of the present invention.

FIG. 6 illustrates a water pump adjustment interface 150 that displays water pump usage graphs 152 and adjustable limits 154 (e.g., sliders) on the amount of water flow a pump can deliver. The sliders 154 of the pump preferably display a percentage of the pump output 156, a limit amount in gallons per minute 158 and an electricity amount in kilowatts per hour 159. Hence, the user can limit a pump output based on water flow and or electricity usage.

Figure 7:
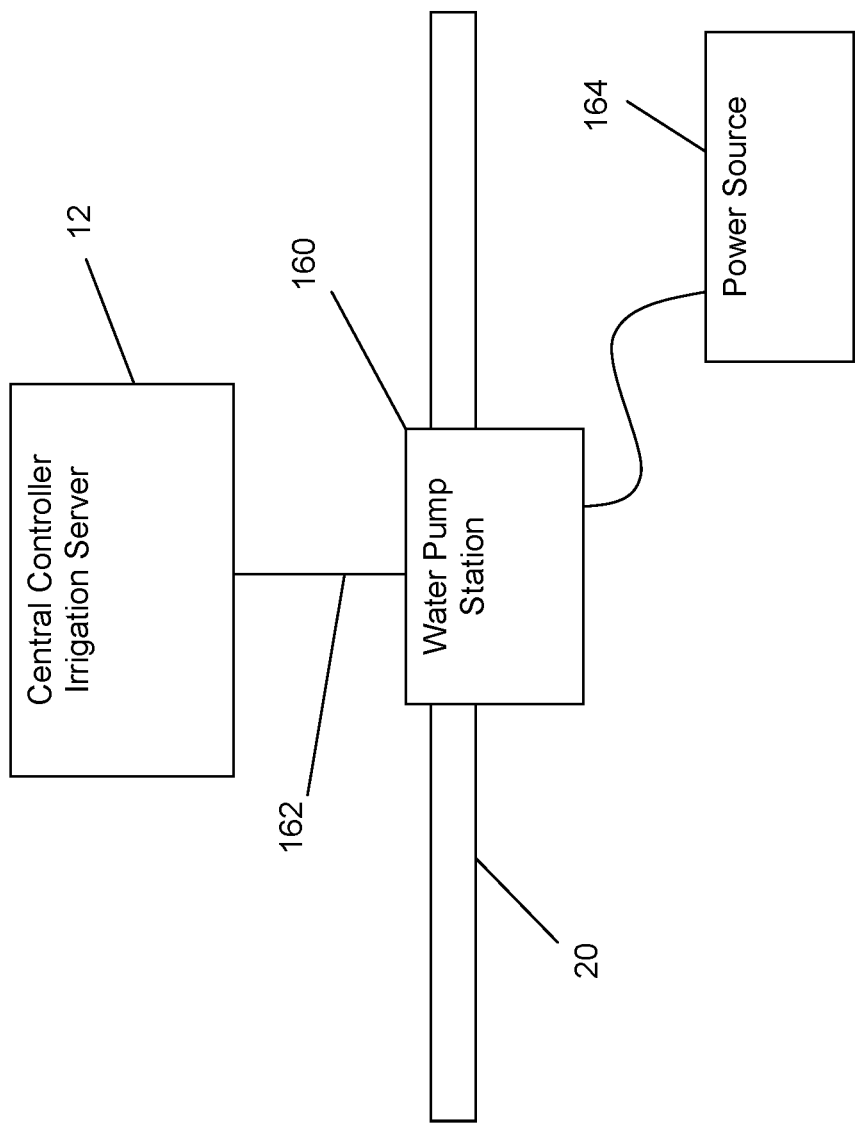
FIG. 7 illustrates a view of a water pump station in communication with a server according to the present invention.
Figure 8:
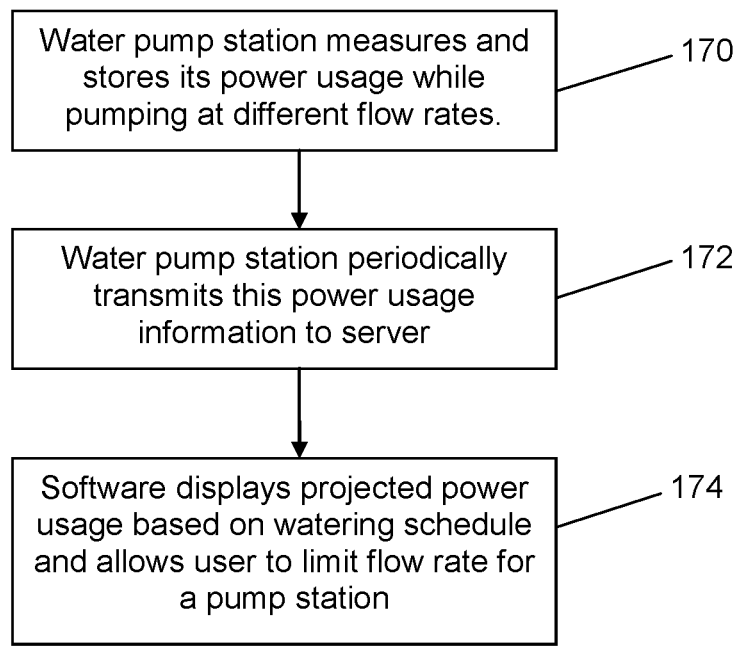
FIG. 8 illustrates a flow chart of a method for monitoring and using efficiency profiles for a water pump.

As seen in FIG. 7 and the flow chart of FIG. 8, the central controller server is preferably connected to a water pump station 160 (e.g., an ITT Flowtronex pump system with Nexus communication capability) via wired or wireless communications line 162 to obtain data for the water pump adjustment interface (step 170). The water pump station 160 measures and stores its power usage from a power source 164 at different flow rates (i.e., different rates that water is pumped through the pump station 160 and through water line 20, step 172). In this respect, the pump station 160 creates and maintains a power efficiency profile for the pump 160 and then communicates this information to the central controller software. Since the efficiency of pump stations 160 tends to change over time (e.g., become less efficient at certain pump speeds with wear, tear, dirt, etc.), the efficiency profile is periodically sent to the central controller software.

In step 174, the software stores the efficiency profile data (e.g. in a database) and displays the corresponding data on the water pump adjustment interface 150. Returning to FIG. 6, the power efficiency profile data can be displayed in the KW/hour display 159 that is associated with each slider 154, displaying rate of power usage and the cost of the power usage (assuming an electricity rate cost is known). As the user adjust the slider 154 upward or downward to modify the flow rate, the KW/hour display 159 changes according to the pump profile. Additionally, the pump usage graphs can display data on the efficiency profile data in a variety of different ways, such as the rate, cost or total amount of electricity for a desired amount of time. In this respect, the power usage and electric cost for an irrigation schedule can be directly managed.

Soil Moisture Sensor Data

The central controller software can accept data from a plurality of soil moisture sensors located on the irrigated turf. This soil moisture data can be stored on the server 12 that executes the central controller software or other locations.

Figure 9:
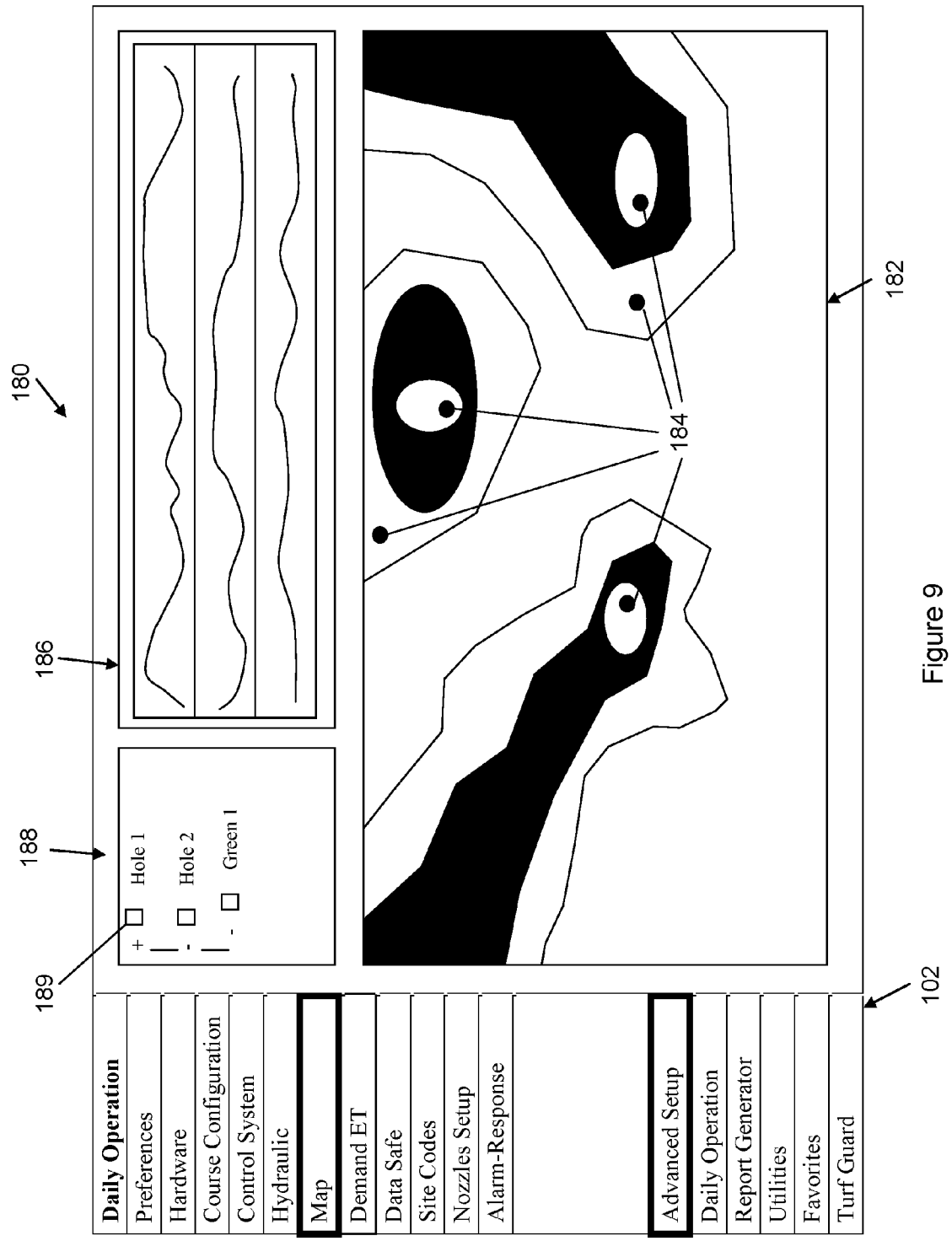
FIG. 9 illustrates a view of an irrigation software display according to a preferred embodiment of the present invention.

FIG. 9 illustrates a soil moisture interface 180 for selectively displaying soil moisture data from the plurality of soil moisture sensors. For example, the user can select which moisture sensor's data is displayed by selecting check boxes 189 in a hierarchical list display 188 of available moisture sensors. Data from selected moisture sensors can be displayed in a variety of different graphs, such as those in graph display 186, that illustrates several moisture history levels, temperature history levels and salinity history levels. A map display 182 can also display the relative location of each moisture sensor by displaying moisture sensor icons 184, based on which check box 189 is checked. Additionally, both the moisture level and an irrigation schedule can be displayed on a single graph, allowing a user to compare the alignment of the moisture level with the irrigation schedule.

Figure 10:
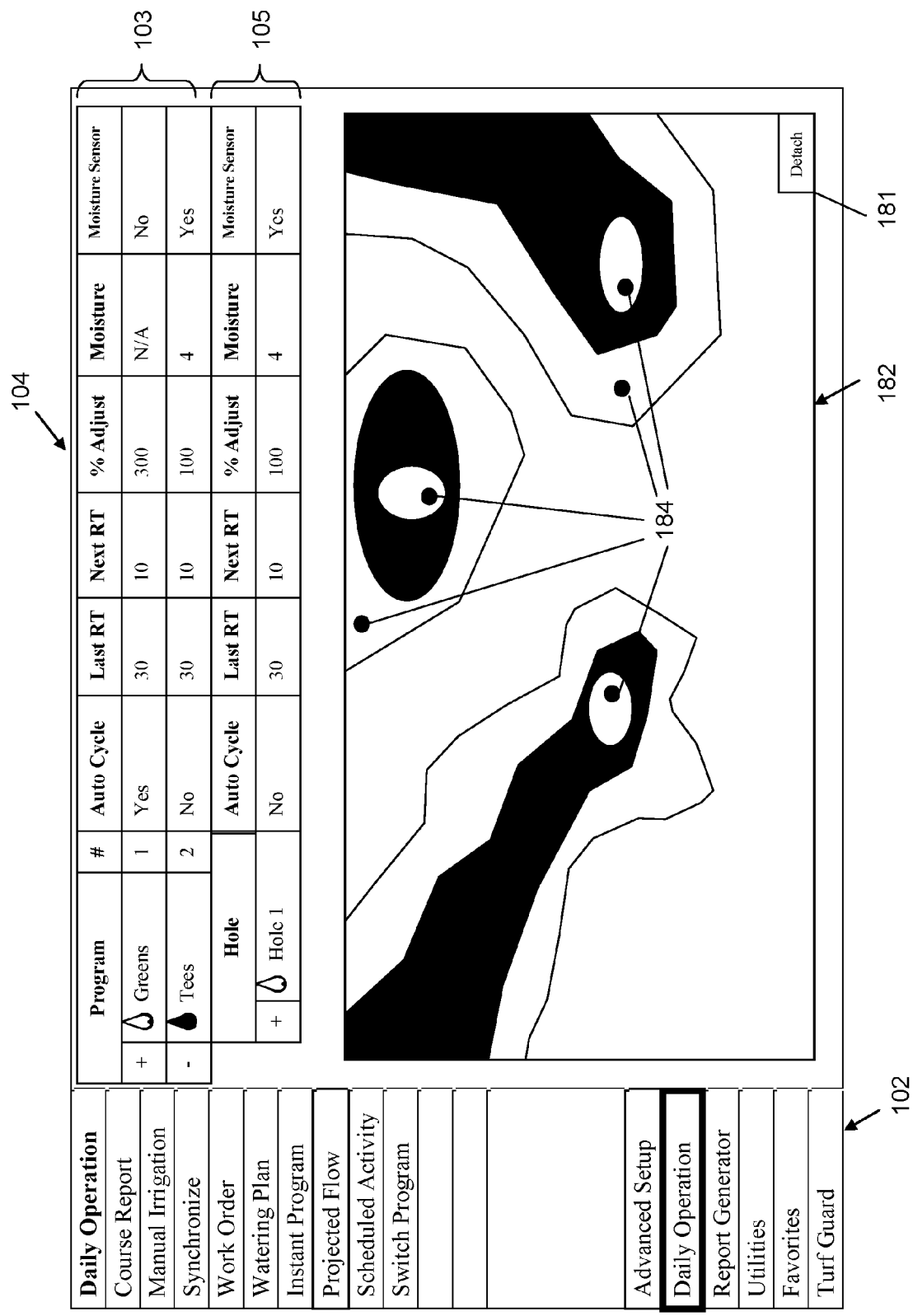
FIG. 10 illustrates a view of an irrigation software display according to a preferred embodiment of the present invention.

As seen in FIG. 10, the watering plan interface 104 and map display interface 182 can also be displayed simultaneously, allowing the user to view the irrigation schedule and the relative locations of soil moisture sensors (or other map items, such as sprinklers).

Flow Interface

Figure 11:
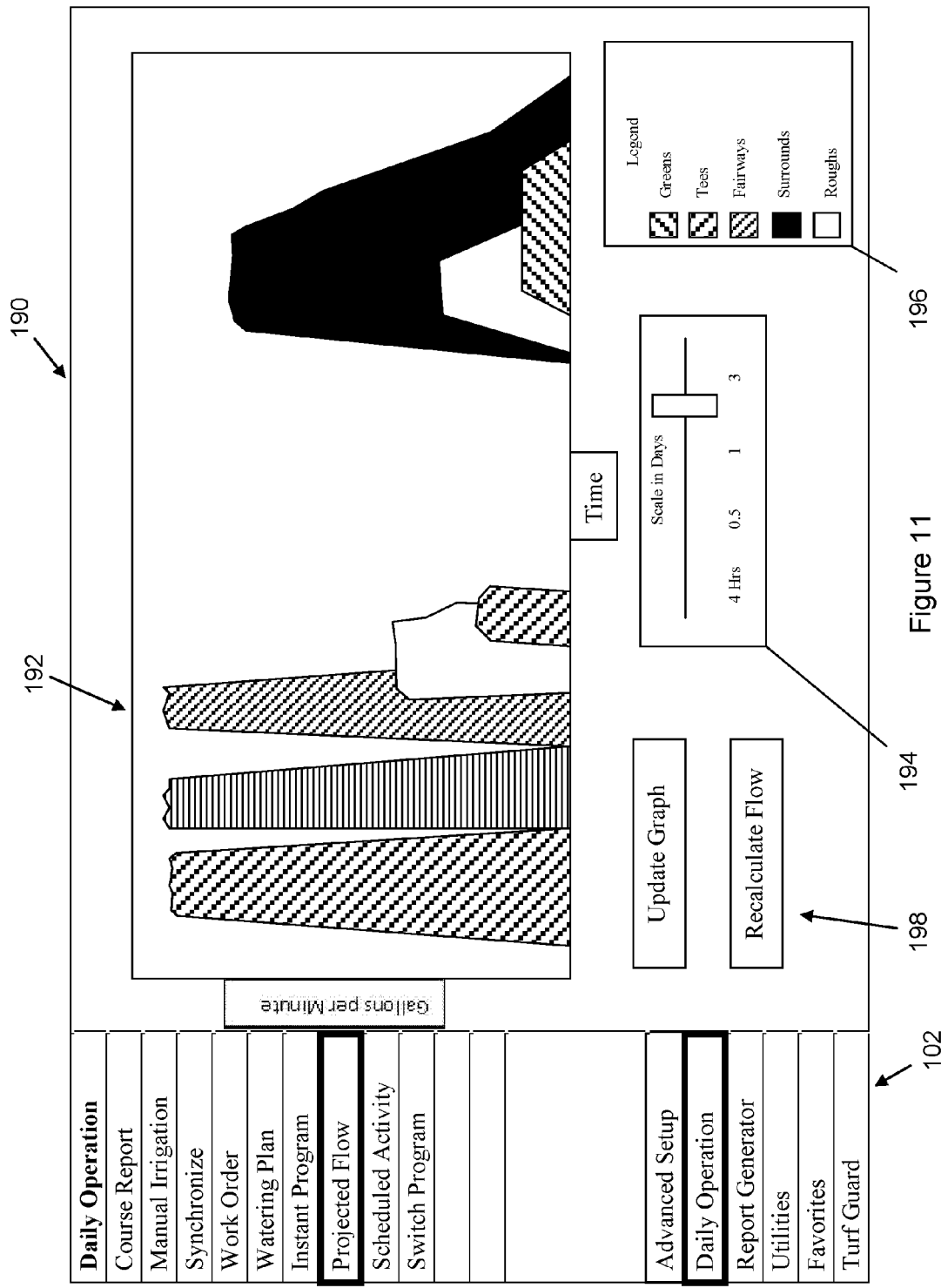
FIG. 11 illustrates a view of an irrigation software display according to a preferred embodiment of the present invention.

As seen in FIG. 11, the central control software also includes a flow interface 190 that displays a flow graph 192 showing past flow (i.e., historical water flow) and future flow according to the watering schedule. Preferably, this flow data is presented in a multicolored graph where each color represents flow from different geographic locations, watering stations, satellite controllers or sprinklers as seen in the legend box 196.

In one example, the graph 192 graphs the gallons per minute versus the time. The scale interface 194 allows a user to adjust the scale of time on the graph 192 while the interface buttons 198 control graph updates and flow recalculations. Alternately, this graph 192 can be displayed on the same page as the watering plan interface 104, allowing a user to view past watering activity, compare this activity to the irrigation schedule (e.g., to see if a prior user made manual watering applications), and see future planned water flow activity.

Demand ET Interface

Preferably, the irrigation software includes a demand evapotranspiration (ET) interface that allows a user to input various ET data such as maximum demand ET, total area, water allotment, manual ET value, low temperature, high temperature, and historic ET values per month. This allows the user to limit and customize the maximum amount of water than can be added to an irrigation schedule due to ET values.

Instant Program Interface

Figure 12:
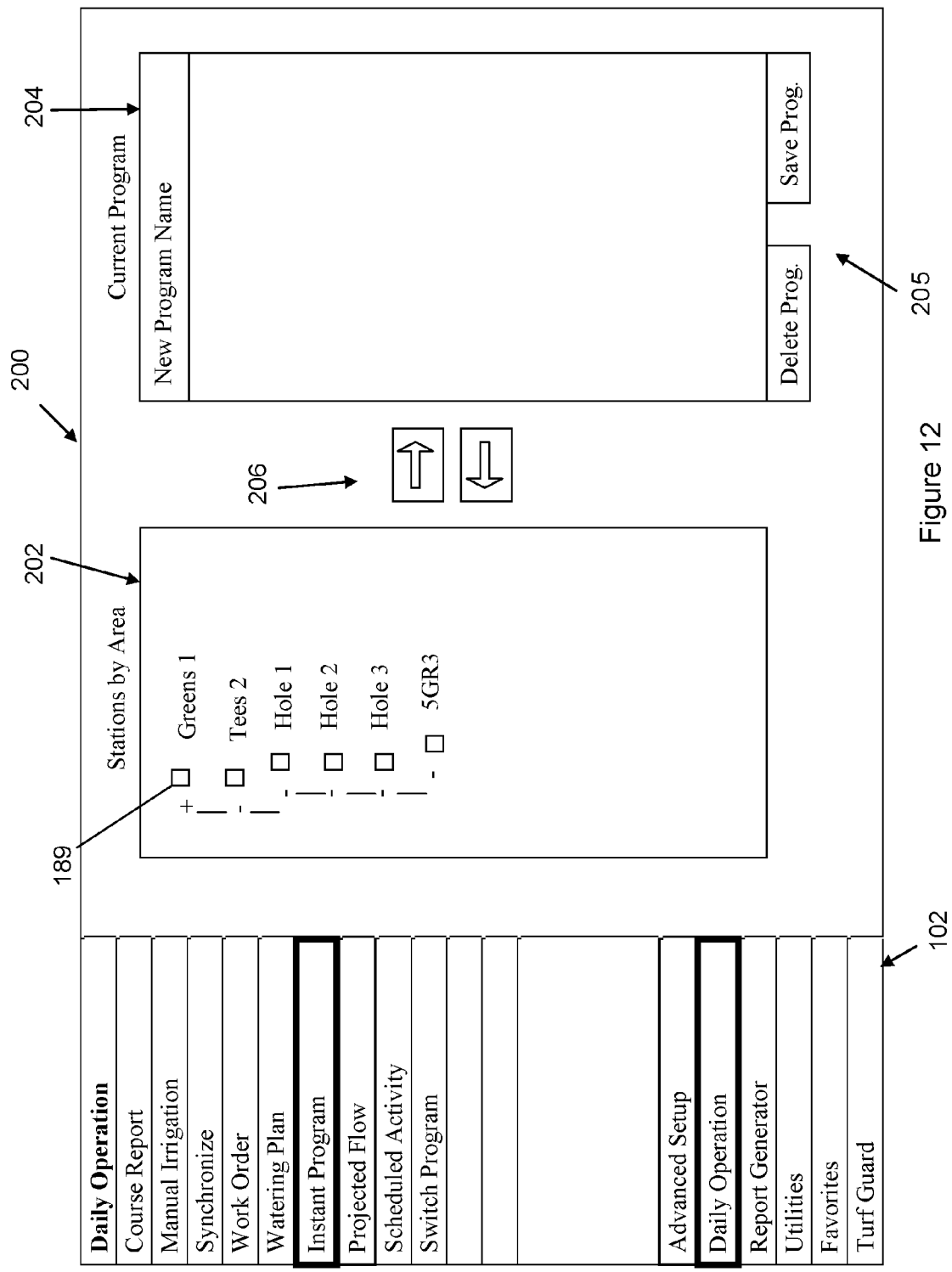
FIG. 12 illustrates a view of an irrigation software display according to a preferred embodiment of the present invention.

FIG. 12 illustrates an instant program interface 200 which allows a user to create a new watering program via a hierarchical interface 202 to run immediately or at a later date. Specifically, watering stations are shown in the hierarchical interface 202 (which operates similarly to interface 108) based on geographic location (e.g., golf course hole). The user can use checkboxes 189 to select irrigation stations and then use arrows 206 to move the stations over to the current program window 204. Once the user has added all of the desired stations, the current program window 204, the program can be named and either saved or deleted via interface buttons 205. Once saved, the program can be set to run immediately or at a future date.

Manual Irrigation

Figure 13:
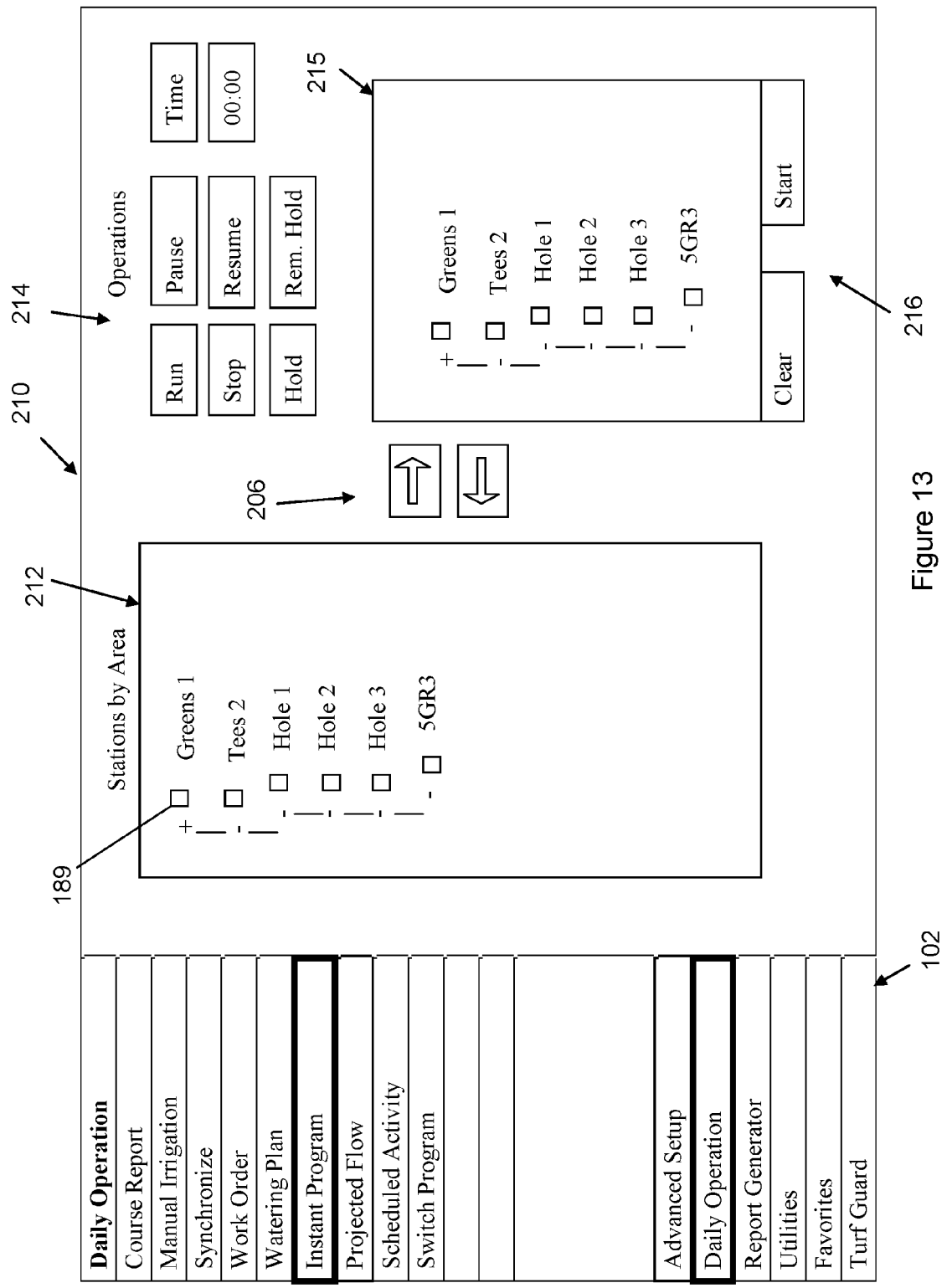
FIG. 13 illustrates a view of an irrigation software display according to a preferred embodiment of the present invention.

FIG. 13 illustrates a manual irrigation interface 210 that allows a user to manually activate specified irrigation stations (e.g., satellite stations) and their associated sprinklers. The user can make a station selection via a selection area 212 (similar to previously described selection area 202 with checkboxes 189) which provides a hierarchical display 212 based on various aspects such as types of areas (e.g., golf tees, fairways, holes, etc.).

Once selected, the interface buttons 206 can be used to copy the selected stations to the manual program window 215 where various program actions can be selected via program buttons 214 (e.g., run, pause, stop, resume, hold, remove hold and length of runtime). Finally, the buttons 216 can be used to start or clear the program.

Precipitation Management Groups

Figure 14:
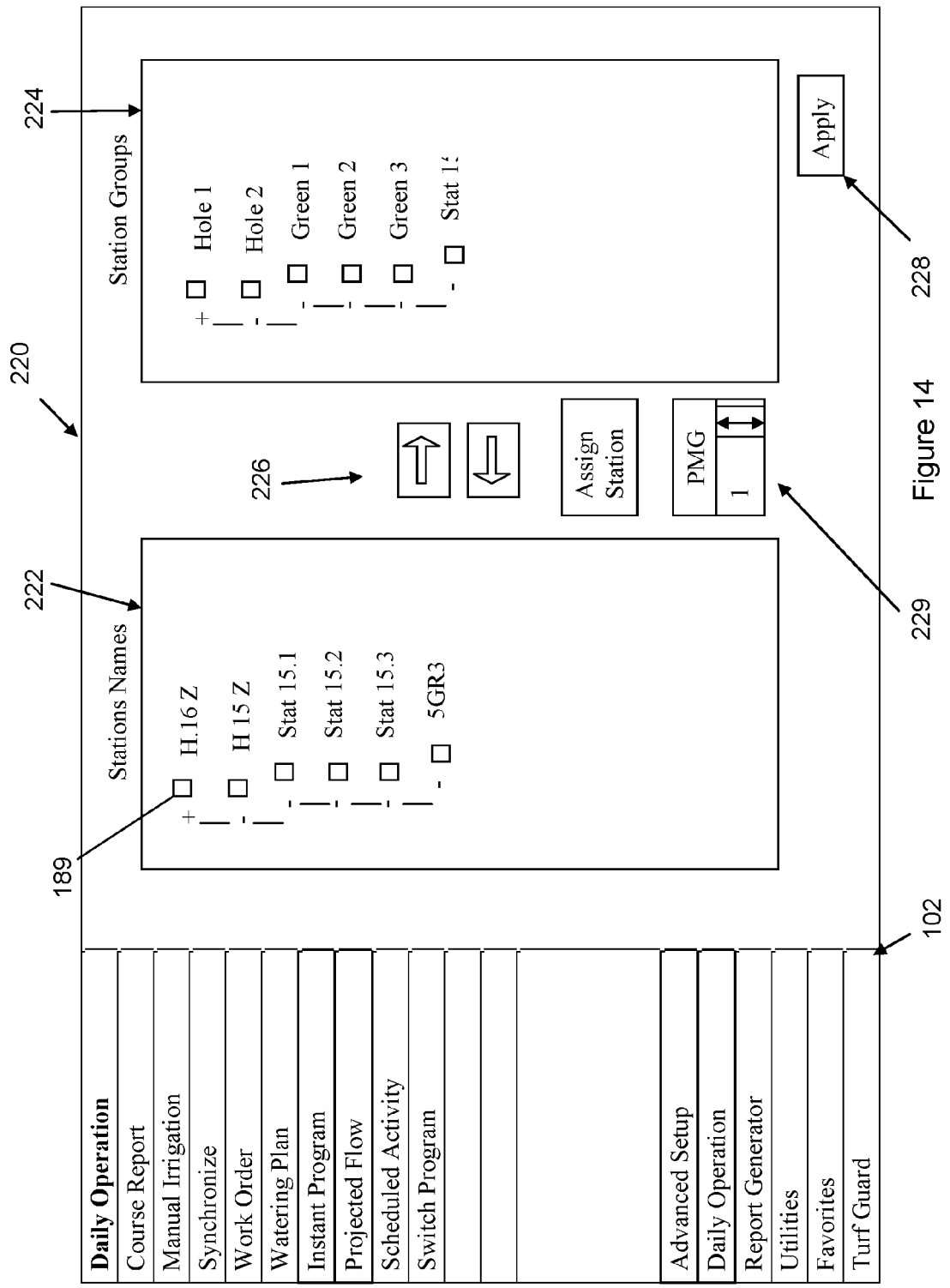
FIG. 14 illustrates a view of i an irrigation software display according to a preferred embodiment of the present invention.

FIG. 14 illustrates a station group interface 220 that allows a user to create a group of irrigation stations that are associated with each other (such as golf greens, holes, roughs or other geographic locations). In this respect, groups of stations can be programmed or adjusted together.

Stations are shown in hierarchical station display 222, allowing for individual selection via checkboxes 189. Once selected, the stations can be added, removed or assigned to a group via buttons 226 and will display in a hierarchical station group display 224. When the station groupings are properly arranged, the user can a group name in the desired station group display 224 and apply the groupings with the apply button 228.

Stations may also be assigned a Precipitation Management Group number via the number increment interface 229 that is used by the flow management routine of the irrigation software to manage the application rate of water. This control is used to limit stations from running at the same time as other stations. In this respect, the rate of precipitation for multiple sprinklers from a geographic area can be fine-tuned to reduce possible runoff of the water (i.e., delivering water faster than the turf can absorb).

Rain Schedule Adjustment

Figure 15:
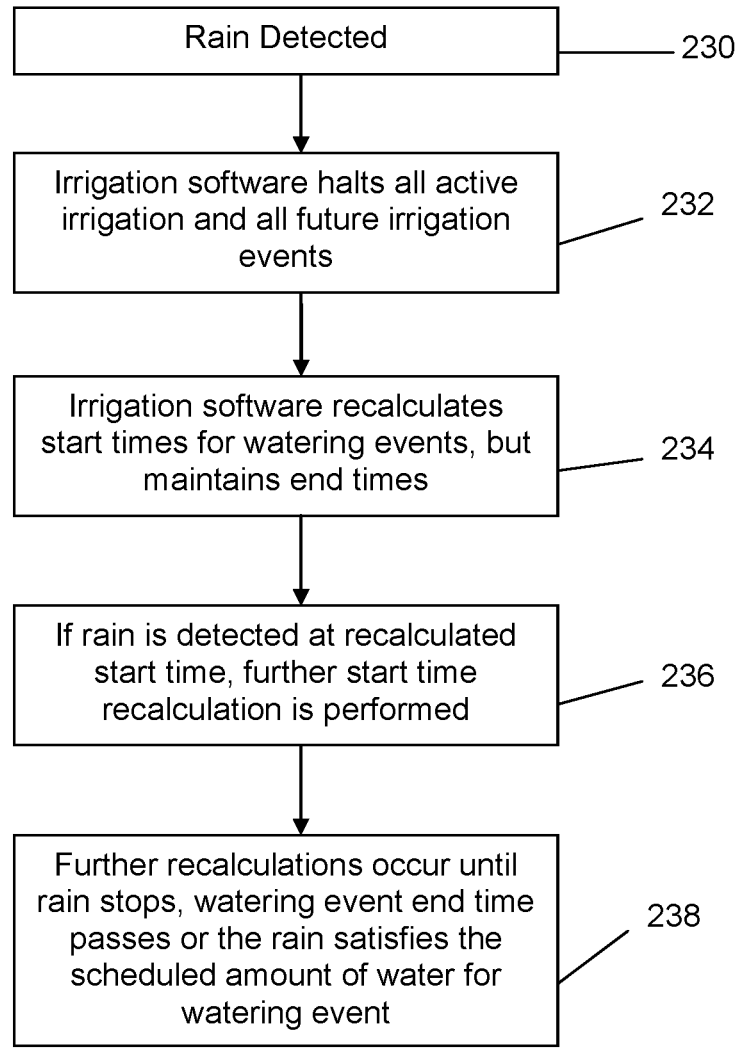
FIG. 15 illustrates a method of recalculating irrigation schedule run times according to the present invention.

Preferably, the central controller software also includes a feature to adjust or delay an irrigation schedule in the event of rain as seen in the flow chart of FIG. 15. In 230, rain is detected (e.g., by a rain sensor or weather station in communication with the server 12).

In 232, any active watering events (i.e., a length of time a station is programmed to irrigate) of the irrigation schedule are terminated. All future watering events have their start time immediately and periodically recalculated to a later time, but the end time of each irrigation event of the irrigation schedule is maintained, as seen in 234. Preferably, this calculation reduces the scheduled duration of the irrigation events based on an amount equal to the rain fall that has been received at that point in time. For example, if one inch of rain has fallen, the irrigation event's start time is reduced by an amount of time equal to irrigate one inch of rain.

If the rain is still falling at the recalculated start time for a watering event in the schedule, the start time (but not the end time) is further recalculated to a later time and the duration of the watering event is further reduced, as seen in 236. As seen in 238, this pattern continues until the rain stops, the originally scheduled duration has been completely satisfied by the received rain fall or the "anchored" irrigation end time passes.

Map To Second Monitor Button

As seen in FIG. 10, the irrigation software interface includes a map detachment button 181 that removes or hides the map display 182 from the current interface view and displays the map display 182 on a second monitor connected to the same server 12. In other words, the map detachment button causes the map display 182 to "move over" to a second monitor that may be attached to the server 12. This function allows a user to view a greater amount of data from another interface (e.g., watering plan interface 104) which may span the entire first monitor, while the entire second monitor can display the geographic irrigation map.

Start Time Shift

Returning to FIG. 2, the irrigation software preferably includes a start time shift interface 107 that allows a user to shift the start times for all watering events for a schedule forward or backward in time. The interface 107 preferably includes a time input window for specifying the amount of time to shift all watering events and forward/backward buttons 107B for executing forward or backward time shift. Hence, the user can easily and quickly shift all watering event times without directly modifying the relatively complex irrigation schedule.

Conditional Screen Saver

Figure 16:
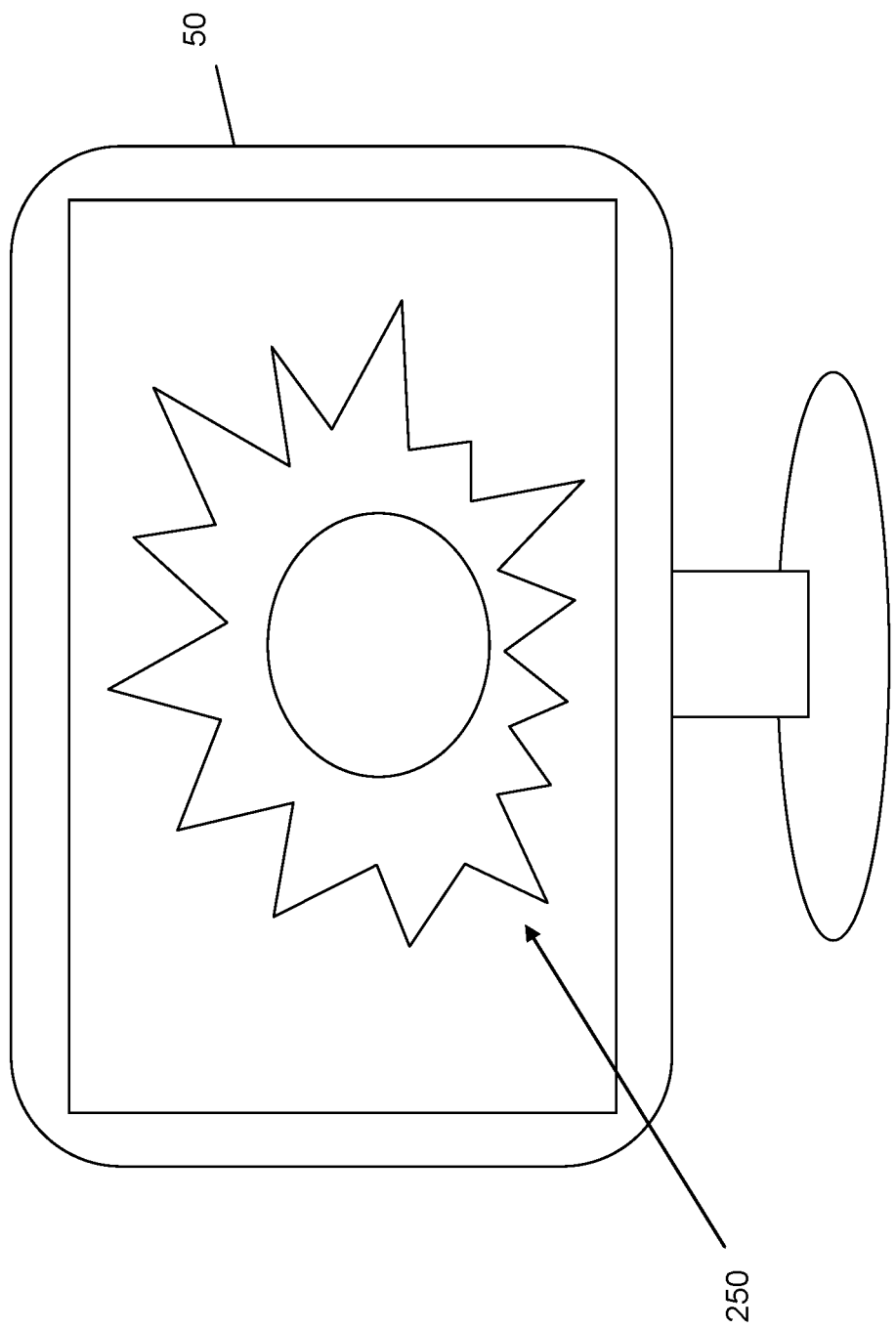

FIGS. 16 and 17 illustrate a computer monitor 50 that displays a conditional screen saver based on the rain/hold state of the irrigation software. When rain, site use, maintenance or a similar an event occurs, an irrigation software user may decide to halt or "hold" an irrigation schedule until the rain or event stops (e.g., by pressing a "hold" button on the software interface). Often, a user may forget that the irrigation schedule has been set to hold or stop all irrigation and therefore may inadvertently prevent irrigation for a longer period of time than desired.

The conditional screen saver helps alert the user to hold status of the irrigation software by displaying several screen savers on the server 12 based on the hold status. For example, screen saver 250 may indicate that the irrigation schedule hold is off, allowing normal irrigation. This screen saver may be a company logo, a sun or even a text message indicating the hold status. Screen saver 252 may indicate that the irrigation schedule hold is on, preventing normal irrigation according to the schedule. This screen saver may be a raining cloud, a circle with a diagonal line through it or a text message indicating the hold status.

When a user modifies the hold status, the irrigation software preferably changes the operating systems screen saver functionality to include the desired text or graphics. Therefore, the server 12 can operate according the screen saver of the rules of the operating system (e.g., Windows, Mac or Linux) while communicating the hold status of the irrigation software.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A system for controlling irrigation comprising:
   a server;
   software executable on said server and configured for programming and running an irrigation schedule for an irrigation system; said software causing said server to graphically display a hierarchical watering plan interface comprising:
   a top level information display, displaying a plurality of watering program entries vertically listed relative to each other; said watering program entries including a program name; and,
   a plurality of top level expansion elements that are each located near and correspond to one of said plurality of watering program entries;
   wherein a user click event on one of said plurality of top level expansion elements displays a previously hidden first subcategory tier immediately beneath a corresponding watering program entry and above any of said plurality of watering program entries below said one of said plurality of watering program entries; said first subcategory tier displaying a plurality of geographic area entries corresponding to one of said plurality of watering program entries.

2. The system of claim 1, further comprising:
   a plurality of geographic area expansion elements that are each located near and correspond to one of said plurality of geographic area entries;
   wherein a user click even on one of said plurality of geographic area expansion elements displays a previously hidden second subcategory tier displaying a plurality of individual sprinkler entries.

3. The system of claim 1, further comprising a plurality of problem indicator elements that provide a visual indication of a problem and that are each located near and correspond to one of said plurality of watering program entries or said plurality of geographic area entries.

4. The system of claim 3, wherein when at least one of said plurality of problem indicator elements activates; a second one of said problem indicator elements corresponding to one of said watering program entries also activates.

5. The system of claim 1, wherein said first subcategory tier display comprises a plurality of horizontally-arranged columns, including a geographic name column.

6. The system of claim 2, wherein said second subcategory tier display comprises a plurality of horizontally-arranged columns, including an irrigation station name column.

7. A system for controlling irrigation comprising:
   a non-transitory computer readable medium comprising a plurality of instructions configured for execution at a server, said instructions configured to cause said server to:
   display a selectively expandable hierarchical watering plan display having a top level containing a list of one or more watering programs vertically listed and containing a watering program name; and,
   a first subcategory display that is selectively user-toggled between a hidden state and a displayed state via a watering program expansion symbol displayed near each of said one or more watering programs;
   said first subcategory display displaying watering plan information corresponding to and immediately below one of said one or more watering programs positioned immediately above said first subcategory display; said first subcategory display being further positioned above any of said one or more watering programs located below said one of said one or more watering programs.

8. The system of claim 7, wherein said top level of said hierarchical watering plan display comprises, a last runtime column, a next runtime column, and a percent adjust column.

9. The system of claim 7, wherein said first subcategory display displays watering plan information for a geographic area.

10. The system of claim 7, wherein said first subcategory display displays watering plan information for each of a plurality of sprinklers.

11. The system of claim 7, a plurality of problem indicator icons that are each located adjacent to and associated with one of an item of said top level or said first subcategory; said plurality of problem indicator icons having a first state indicating an irrigation problem and a second state indicating no irrigation problems.

12. The system of claim 11, wherein any problem indicator icons associated with one of an item of said top level changes to said first state indicating a problem when any of said problem indicator icons associated with one of said first subcategory associated with said one of said item of said top level also changes to said first state indicating a problem.

13. A system for controlling irrigation comprising:
   a non-transitory computer readable medium comprising a plurality of instructions configured for execution at a server, said instructions configured to cause said server to:
   display a hierarchical watering plan list having a first hierarchy level and a plurality of first hierarchy level entries that are vertically listed within said hierarchical watering plan list and that each include a program name, a second hierarchy level that is user-toggled between a hidden state and a displayed state beneath each entry of said first hierarchy level, and a third hierarchy level that is user-toggled between a hidden state and a displayed state beneath each entry of said second hierarchy level;
   wherein said second hierarchy level and said third hierarchy level are located beneath one of said plurality of first hierarchy level entries and above any of said plurality of first hierarchy level entries located beneath said one of said plurality of first hierarchy level entries.

14. The system of claim 13, wherein said each entry of said first hierarchy level contains information relating to an individual irrigation program.

15. The system of claim 14, wherein said each entry of said second hierarchy level contains information relating to different geographic regions of turf.

16. The system of claim 15, wherein each entry of said third hierarchy level contains information relating to individual sprinklers within said different geographic regions of turf.

17. The system of claim 16, further comprising a plurality of alert icons, each of which associated and positioned near an entry for said first hierarchy level, said second hierarchy level, and said third hierarchy level, wherein each of said plurality of alert icons are programmed to change to an alert state when any of said plurality of alert icons in a lower associated hierarchy level change to said alert state.

18. The system of claim 13, wherein said first hierarchy level, said second hierarchy level, and said third hierarchy level all include a last runtime column, a next runtime column and a start time column.

* * * * *